Aug. 4, 1942. H. A. MANTZ Re. 22,155

MAGNETIC VALVE

Original Filed Jan. 8, 1937

Inventor:
Harold A. Mantz

By Brown, Jackson, Boettcher & Dienner
Attys.

Reissued Aug. 4, 1942 Re. 22,155

UNITED STATES PATENT OFFICE 22,155

MAGNETIC VALVE

Harold A. Mantz, Milwaukee, Wis., assignor to Milwaukee Gas Specialty Company, Milwaukee, Wis., a corporation of Wisconsin Original No. 2,187,834, dated January 23, 1940, Serial No. 182,669, December 31, 1937, which is a division of Serial No. 119,557, January 8, 1937, now Patent No. 2,271,506, dated January 27, 1942. Application for reissue November 5, 1941, Serial No. 417,941

11 Claims. (Cl. 137—139)

This invention relates to thermo-electric safety devices, and more particularly is directed to such devices employed in connection with gas burner igniting apparatus for use in heating appliances such as hot water heaters, ranges, and similar apparatus.

The present application, which is a division of my copending application Serial No. 119,557, filed January 8, 1937, is directed particularly to the magnetic valve.

In the copending application of John H. Thornbery and myself, Serial No. 743,382, filed September 10, 1934, there is disclosed a safety device of the type in which the valve controlling the supply of fuel to the main burner can be manually held open when the pilot flame has been extinguished. In some situations this may be undesirable, since a large accumulation of gas may collect in the burner chamber before the pilot flame is ignited, with resulting hazards of explosion.

The present invention contemplates a mechanism in which the main valve member is snapped closed whenever the pilot burner is extinguished, and cannot be moved to open position until the pilot burner is again ignited. This precludes any attempt to hold the valve open while the pilot burner is extinguished.

In conjunction with this feature, the present invention includes means for by-passing a certain quantity of fuel through or around the valve while it is in closed position to supply the pilot burner during the manual resetting operation.

Provision is made for directing the by-passed gas to the pilot burner through a connection which also serves as one conductor for the thermocouple formed at and responsive to the heat of the pilot burner.

As one important advantage of the present construction I provide a thermocouple combined with a pilot burner, the connection from the thermocouple to the safety device in turn forming the supply passage from the fuel supply line to the pilot head, which is supported solely by this connection.

In addition, the combined thermocouple and pilot head are connected to the safety device through a quick detachable connection which allows rapid and easy assembly without the necessity of terminal lugs, solder connections or the like.

Still another advantage of the present invention resides in the provision of a magnet frame which may be of round, circular, or of any other suitable or preferred type, and which is mounted for reciprocatory movement in the housing of the safety device. The magnet frame assembly and resetting mechanism is provided with coacting spring means whereby, upon imparting the resetting movement to the magnet frame, the secondary or by-pass valve means is opened while the main safety valve remains closed, and upon energization of the electromagnet by the thermoelectric current the valve is held to the magnet frame and the valve and magnet frame are conjointly moved into valve opened position, the by-pass valve to the pilot burner being simultaneously closed.

Another important advantage of the present invention is that the safety device may be mounted in any position in the fuel supply line, and the valve mechanism, magnet frame and resetting mechanism remain fully operative regardless of the position in which the device is mounted.

Still another advantage of the present invention is the use of the housing of the device itself as the ground connection for one side of the electromagnetic coil, whereby the combined thermocouple and pilot burner has one side thereof directly grounded to the housing, while the other side thereof is connected through an insulated and closed conductor to the coil, this conductor at the same time forming a gas supply passage to the pilot burner from the valve seat.

Other objects and advantages of the present invention will be more apparent from the following detailed description which, taken in conjunction with the accompanying drawing, will disclose to those skilled in the art the particular construction and operation of a preferred form of the present invention.

Figure 1:
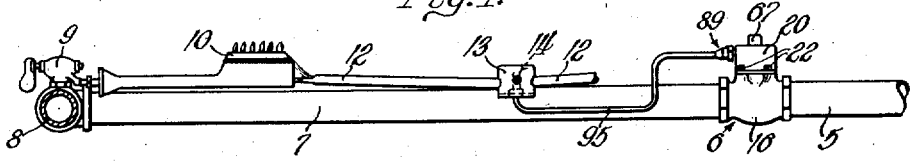
Figure 1 is a diagrammatic view showing the application of the present invention to heating apparatus.

Referring now in detail to the drawing, in Figure 1 I have shown the main fuel supply line 5, having the safety device 6 mounted therein, and communicating through the conduit 7 from the outlet side of the safety device to a fuel supply manifold or the like indicated at 8, provided with the usual gas cock 9, which may be either manually or automatically operated, for delivering fuel under pressure to the main burner 10.

The burner 10 is preferably ignited by means of a lighter tube 12 which extends into the torch head 13 receiving the pilot head indicated generally at 14. In the embodiment of the invention shown in Figure 1, the device has been shown and applied to a gas range in which a number of burners 10 may be mounted symmetrically about the torch head 13, each being supplied with a lighter tube 12 whereby gas from the main burner 10 is transmitted through an auxiliary port and the tube 12 to the pilot burner, is there ignited and flashes back to the burner to ignite the main burner ports. However, it is to be understood that the torch head 13 and lighter tubes 12 may be eliminated, and in such case the pilot burner 14 may be disposed directly adjacent the main burner 10, where only a single burner is employed, such as in hot water heaters or other types of heating apparatus.

Figure 2:
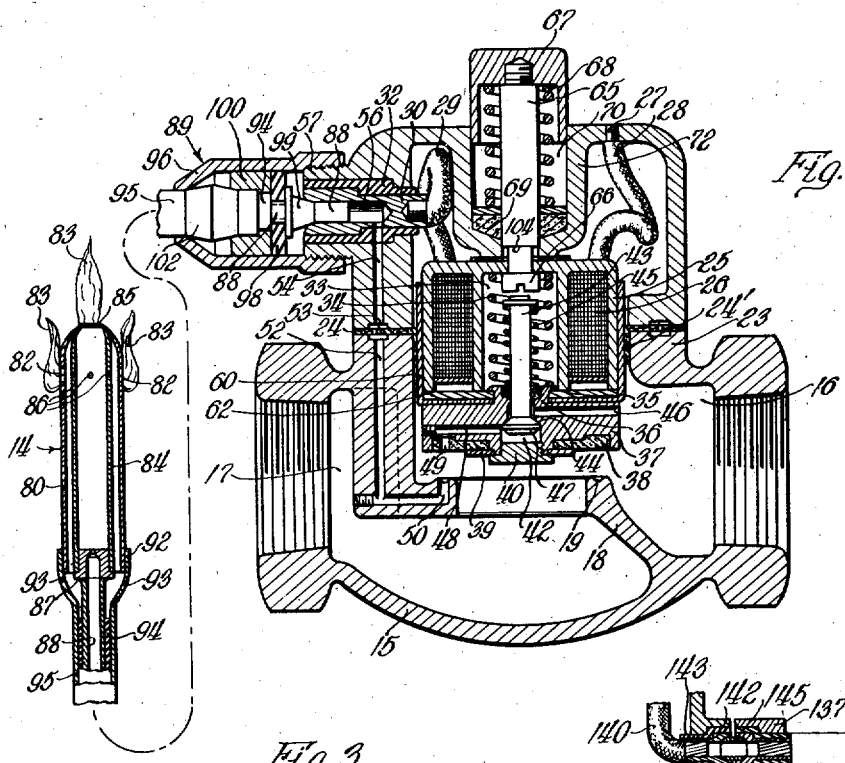
Figure 2 is a sectional view through the device of the present invention, including the combined thermocouple and pilot head construction.

Considering now in detail the specific construction illustrated as showing one form of the present invention, in Figure 2 I have provided a safety device comprising the main valve body 15, provided with the inlet chamber 16 and with the outlet chamber 17. Intermediate these chambers there is provided the partition 18 forming the valve seat 19 defining the opening through which communication is effected between the inlet and outlet chambers.

Mounted in any suitable manner upon the upper portion of the valve body 15 is a housing 20, which may be bolted thereto as indicated by the cap screws 22, or may be secured thereto in any other suitable or desired manner. Interposed between the housing 20, which is preferably of inverted cup-shape, and the annular shoulder 23 of the valve body 15 is a gasket member 24 which seals the surfaces that are clamped together, and is provided with an axially extending flange portion 24' at its inner periphery.

Mounted in the passage formed between the valve body 15 and the housing 20 is a magnet frame member 25, having the electromagnetic coil 26 carried therein, the coil 26 having one terminal thereof grounded to the housing 20 as indicated at 27 through the conductor 28, and having its opposite terminal connected through conductor 29 to a terminal stud 30 which is disposed in insulated relation to the housing by being carried within the insulating bushing 32.

The magnet frame 25 is provided with a central axially extending recess 33, which is adapted to receive a spring member 34 biased at one end against the inner end of the recess 33, and at its opposite end bearing against the turned over edge 35 of the projecting stem portion 36 of valve member 37, the member 37 in turn carrying at its lower base the leather valve seating member 38 adapted to have engagement with the valve seat 19. The leather seating member is held in position by the retaining washer or disc 39, which in turn is secured to the member 37 by means of the threaded plug 40 extending into the open end of the recess 42 formed in the member.

A suitable valve stem 43 is carried within the recess 42 of the member 37, and normally is pressed into seating engagement with the valve seat 44 by means of the spring 45 encircling the valve stem and biased at its lower end against the packing carried in the upper end of the recess 42.

The member 37 is provided with a laterally extending port 46, which extends into and communicates with the passageway 42 above the valve stem head 47. The member 37 is also provided with a second axially offset laterally extending passageway 48 which, adjacent its outer end, communicates through the passageway 49 directed axially of the valve member and through the valve member 38 to the lower radial face of the valve member 38.

The valve seat 19 is provided with a passageway 50, adapted to be aligned with the passageway 49 and extending upwardly through the valve body as indicated at 52 to the gasket 24. The gasket 24 is apertured, as indicated at 53, providing communication between the passageway 52 and a corresponding passageway 54 extending through only one side wall of the housing 20 and through the insulating bushing 32 into the interior of the terminal member 30, which terminal member is provided with an axially outwardly directed recess 56 which opens outwardly through the threaded boss portion 57 extending laterally from the side of the housing 20.

The valve member 37 forms, together with the cup-shaped member 60 and the annular plate member 62, an armature-like valve member which is movable toward and away from the lower end of the magnet frame 25, having sliding movement guided by the axially extending flange portion 24' of the gasket 24. Thus, when the coil 26 is deenergized, the spring 34 urges the armature, consisting of the members 60, 62 and 37, downwardly away from the lower end of the magnet frame 25 and into engagement with the valve seat 19.

The magnet frame 25 is normally retained in position within the safety device by means of the spindle member 65, which has the head portion 66 engaged within the recess 33 of the magnet frame, and which extends upwardly and carries at its outer end the resetting button 67 which is threaded to the end of the spindle 65 and is recessed to receive one end of the spring 68, the opposite end of the spring 68 bearing against packing 69 carried within the recessed portion 70 or extending downwardly into the housing 20 and formed integral therewith. The spring 68 normally urges the button 67 outwardly of the housing 20, and thereby urges the spindle 65 upwardly, holding the magnet frame 25 against the lower end of the wall portion 72 of the housing which defines the recess 70.

Considering now in detail the pilot burner construction, this comprises an outer tubular member 80 which is provided with relatively large open ports 82 through which pilot flames 83 are adapted to project, as indicated diagrammatically in Figure 2, and which is joined to an inner tubular member 84, there being a welded junction between these two members, as indicated at 85, forming a thermocouple junction disposed in the path of the pilot flame 83. The inner tubular member 84 is provided with a plurality of ports 86 of reduced area as compared to the ports 82, and is connected, at its open end, through the bushing 87 with a hollow metallic conduit 88 which extends to the thermocouple and burner connection indicated generally at 89 whereby the burner and thermocouple are connected to the safety device 6. The lower end of the outer member 80 is supported by a spider-like member 92 which is provided with openings 93 therein for admitting air into the space between the members 80 and 84, this air merging with the gas issuing from the ports 86 to produce the burner flame 83. Suitable insulation 94 is provided between the inner metallic structure 88 and the outer metal tube 95 which terminates in the spider 92. It will thus be seen that a thermocouple junction is provided at 85, and that one terminal of this junction is connected through the outer cylindrical member 88 and the metal tube 95 to the thimble 96, which is threaded over the threaded extension 57 of the housing 20, and thereby completes a connection to the grounded terminal 27 from one side of the coil 26. The other side of the thermocouple circuit extends from the inner tubular member 84 and the metal conduit member 88, within the insulating sleeve 94, to the recess 56 formed in the terminal bushing 30. This makes metallic contact through the bushing 30 with the conductor 29 leading from the other side of the magnetic coil 26.

An insulating disc 98 is disposed about the projecting end of the conduit 88 within the thimble 96, and a wedge-shaped member 99, preferably of ductile metal, is disposed over the projecting end of the conduit 88 whereby, upon threading of the thimble 96 upon the extension 57, the wedge member 99 is wedged, together with the projecting end of the conduit 88, into the recess 56 of the thimble 30, and consequently forms a positive and gas tight electrical connection therewith which is insulated from the metal tube 95 and from the supporting sleeve 100 disposed within the thimble 96. If desired, the metal tube 95 may be provided with a riding wipe or enlargement 102 with which the thimble 96 may engage at its reduced end in order to move the entire structure as a unit inwardly with respect to the bushing 30 when the thimble is tightened over the extension on the housing 20.

This provides a quick detachable connection not requiring the unloosening of any terminal screws, terminal lugs or the like, since by merely unthreading the thimble 96, the connection between the conduit 88 and the bushing 30 may be readily broken, and the entire pilot burner and thermocouple structure may be removed from the safety device 6.

In the operation of the device as thus far described, the device is shown in Figure 2 as being in valve opened position, with the pilot flame ignited and the magnetic coil 26 thereby energized to hold the armature, including the valve member 37, to the magnet frame against the resistance of the spring 34. This is due to the fact that the heat of the pilot flame acting on welded junction 85 creates a current flow between the metal tube 95 and the hollow conduit 88 which, in turn, creates a flow of current through the coil 26 sufficient to magnetize the magnet frame 25 and create an attractive force on the valve member 37 sufficient to hold it against the magnet frame. Consider now that the pilot flame is accidentally extinguished. The thermocouple junction rapidly cools and thereby deenergizes the coil 26. The spring 34 thereupon becomes active and snaps the valve member 37 downwardly into engagement with the valve seat 19. This results in relative sliding engagement of the cup-shaped member 60 with respect to the gasket portion 24' of the gasket 24, while the magnet frame 25 and the coil 26 remain in fixed position due to the effect of the spring 68. The valve is therefore closed, closing off communication between the inlet chamber 16 and the outlet chamber 17, and also closing off the fuel supply to the pilot burner. This latter fuel supply is closed off due to the fact that the spring 45 retains the valve stem 43 in position with the head 47 thereof pressed against the valve seat 44 so that no gas may flow from the inlet chamber 16 through the passageways 46 and 48 to the passageway 50.

When it is desired to either ignite the main burner or to reignite the pilot burner, the resetting button 67 is manually pushed downwardly. This results in moving the spindle 65 downwardly with respect to the magnet frame 25, and the magnet frame thereby slides downwardly within the upper end of the cup-shaped member 60, due to the fact that the shoulder 104 of the spindle 65 engages the top of the magnet frame and forces it downwardly against the pressure of spring 34. At the same time, the head end 66 of the spindle 65 engages the upper end of the valve stem 43, forcing the valve stem 43 away from its seat 44, and thereby opening communication between the passageways 46 and 48 formed in the valve member 37.

As a result, the gas which is under pressure in the inlet chamber 16 flows through the passageways 46 and 48 and thence through the axially extending passageway 49 into the passageway 50 formed in the valve seat 19. From the passageway 50, this gas flows upwardly through passageways 52 and 54 and into the recess 56 in the terminal bushing 30. From this recess, gas is passed through the hollow conductor 88 to the interior of the tubular member 84, from which it escapes through ports 86 and mixes with air introduced into the interior of the tubular member 80, and can be ignited as it issues with the air from the ports 82. The resulting pilot flames serve to energize the thermocouple, creating a current which in turn energizes the coil 26 and causes the armature formed by the members 60, 62 and 37 of the valve construction to be held positively against the lower end of the frame 25 by magnetic attraction. As a result, when the reset button 67 is released, the spring 68 moves the button 67 and spindle 65 upwardly, which in turn, through the head end 66 of the spindle 65, moves the frame 25 upwardly and consequently moves the valve member therewith, the two being held in magnetic attraction. This opens the valve, and the gas may then flow from the inlet chamber 16 through the valve seat 19 into the outlet chamber 17 and thence to the main burner or burners. At the same time, sufficient gas is still supplied through the port 50 in the valve seat to maintain the pilot burner 14 ignited, and consequently retain the valve member in raised position against the lower end of the magnet frame 25. Upon any accidental extinguishment of the pilot burner, the magnet is immediately deenergized, and the spring 34 consequently forces the valve member down into engagement with the valve seat, thereby shutting off flow of fuel to either the pilot burner or the main burner.

Figure 3:
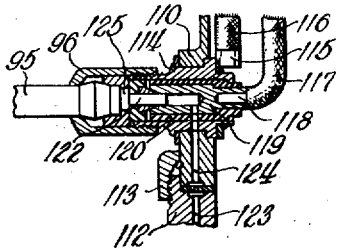
Figure 3 shows a modified manner of connecting the thermocouple to the device.

In Figure 3 I have shown a modified structure, in which the coil 26 of the magnet is connected to the two terminals of the thermocouple junction, and is not grounded on the housing. In this embodiment of the invention, the upper housing of the safety device is indicated at 110, and is connected to the valve body housing 112 through the threaded sleeve 113 carried by the housing 110. A suitable bushing 114 is secured in the side wall of the housing 10, and is adapted to receive, on its inner end, the terminal 115 of a conductor 116 leading to one side of the coil 26.

The other side of the coil 26 is connected through conductor 117 and terminal 118 to a terminal bushing 119 which is insulated within the bushing 114 by the insulating sleeve 120. The thermocouple connection leading from the pilot burner, and consisting of the outer metallic tube 95, the thimble 96 which threads over the bushing 114 to effect electrical connection from the tube 95 through the thimble 96 and bushing 114 with conductor 116, and the inner hollow conductor 122, extends into the terminal bushing 119 and is wedged therein in substantially the same manner as described in connection with Figure 2. At the same time, gas for the pilot burner is supplied to ports 123 and 124 in the housings 112 and 110, respectively, to the interior of the terminal bushing 119, and thence through the hollow conductor 122 to the pilot burner. Suitable insulating sleeve means 125 is provided between the outer metallic tube 95 and the inner hollow metallic conductor 122. The details of the manner in which the thermocouple and burner connections can be quickly coupled and disconnected from the housing structure is believed apparent from the drawing, when considered in conjunction with the description of this particular manner of assembly as set forth in connection with Figure 2.

Figure 4:
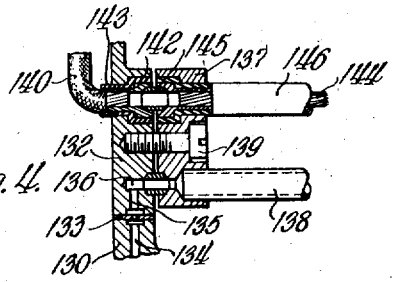
Figure 4 shows a still further modified arrangement.

In Figure 4 I have shown a still further modified construction, in which the supply for the pilot burner is separated from the connection to the thermocouple junction. In this embodiment of the invention, the valve body is indicated at 130, while the housing for the magnet frame and reset mechanism is indicated at 132, the two being secured together with the gasket 133 interposed therebetween in any desired manner. A suitable port 134 is formed in the valve body 133 and extends upwardly through the gasket and into the port 135 communicating with the interior 136 of a recess which opens outwardly through the attaching member 137 to the hollow conduit 138 leading to the pilot burner. The attaching member 137 is secured to the housing 132 by means of the cap screw 139, threaded to the side wall of the housing. The connection for the coil 26 is provided by the conductor 140, which extends into the metallic thimble 142 secured within the insulating bushing 143 and joined to the conductor 144 extending to the thermocouple junction by means of the coupling member 145. Suitable insulation 146 extends about the conductor 144, and into the attaching member 137, forming a continuation of the insulating bushing 143.

As far as the operation of the device or the energization of the coil 26 and the supply of fuel to the pilot burner are concerned, the mechanism shown in Figures 3 and 4 will operate in the same manner as described in connection with Figure 2, and no further description of the operation thereof is deemed necessary.

It is therefore believed apparent that I have provided a novel type of safety device, in which the magnet frame is reciprocally mounted in the housing for the safety device, and is moved downwardly into engagement with the valve member in order to pick up the valve member when the magnet has been energized and move it into valve open position. At the same time, whenever the pilot flame is accidentally extinguished, the supply of fuel to both the main burner and the pilot burner is automatically shut off, and when the resetting means is actuated, a limited supply of fuel to the pilot burner is provided without opening the main valve until such time as the pilot burner has been ignited and a sufficient current has been generated to allow actuation of the magnet. Further, I have provided means for rapidly attaching and disconnecting the thermocouple and pilot burner connections, which facilitates assembly of the device, and insures easy replacement or repair in case of damage, or for inspection.

I am aware that various modifications may be made in details of structure and particular design, and intend that the illustrated embodiment of the invention be considered for purposes of illustration only as showing one form of the invention. I do not intend to limit my invention to the exact details shown, but only insofar as defined by the scope and spirit of the appended claims.

I claim:

1. A safety device for a fuel supply line including a valve body, a valve seat therein, a valve engageable with said seat and having an armature, magnetic means comprising a magnet frame and an energizing coil for said magnet frame both reciprocably mounted with respect to said valve, primary spring means normally urging said magnetic means away from said seat, secondary spring means biased between said magnetic means and said armature and normally urging said valve into engagement with said seat, energizing means for said magnetic means capable of holding said armature in attracted position thereon but incapable of moving said armature from valve closed position into attracted position against the pressure of said secondary spring means, and resetting means for manually moving said magnetic means into engagement with said armature against the pressure of said primary spring means whereby said valve is moved to open position upon release of said resetting means when said magnetic means is energized at the time of release of said resetting means.

2. A control valve comprising a valve body having an inlet, an outlet, and an intermediate valve opening having a valve seat, a movable electromagnet comprising a magnet frame and a coil for energizing said magnet frame, a unitary armature and valve member means engageable with said seat to close communication between said inlet and said outlet and having movement relative said electromagnet, means for separating said unitary armature and valve member means from said electromagnet and for moving same into engagement with said valve seat upon deenergization of said electromagnet, resetting means for moving said electromagnet toward the valve seat and to position to engage the magnet frame with the armature portion of said unitary armature and valve member means to pick up said armature and valve member means for movement with said electromagnet in the opposite direction when the electromagnet is energized, spring means for retracting said electromagnet away from said seat and operable to move the armature and valve member means therewith to open the valve when said electromagnet is energized, a by-pass around said valve opening, a valve member controlling said by-pass, and means for opening said last valve member by the movement of said resetting means in engaging the magnet frame of the electromagnet with the armature portion of said unitary armature and valve member means.

3. In combination, a valve body having an inlet, an outlet, and an intermediate valve opening having a valve seat, a movable electromagnet comprising a magnet frame and a coil for energizing said magnet frame, a unitary armature and valve member means engageable with said seat to close communication between said inlet and said outlet and having movement relative to said electromagnet, means for separating said unitary armature and valve member means from said electromagnet and moving same into engagement with said valve seat upon deenergization of said electromagnet, resetting means for moving said electromagnet to position to engage the magnet frame with the armature portion of said unitary armature and valve member means, means for retracting the electromagnet away from said seat and operable to move the armature and valve member means therewith to open the valve when said electromagnet is energized, a hood on said valve body and a by-pass passage around said valve opening and extending through the valve body and said hood.

4. In combination, a valve body having an inlet, an outlet, and an intermediate valve opening having a valve seat, a movable electromagnet comprising a magnet frame and a coil for energizing said magnet frame, a unitary armature and valve member means engageable with said seat to close communication between said inlet and said outlet and having movement relative to said electromagnet, means for separating said unitary armature and valve member means from said electromagnet and moving same into engagement with said valve seat upon deenergization of said electromagnet, resetting means for moving said electromagnet to position to engage the magnet frame with the armature portion of said unitary armature and valve member means, means for retracting the electromagnet away from said seat and operable to move the armature and valve member means therewith to open the valve when said electromagnet is energized, a hood on said valve body, a by-pass passage around said valve opening and extending through the valve body and said hood, a valve member controlling said by-pass passage, and means for opening said last valve member by the movement of said resetting means in engaging the magnet frame of the electromagnet with the armature portion of said unitary armature and valve member means.

5. In combination, a valve seat, a valve member cooperable with said valve seat and provided with an armature portion, an electromagnet mounted for movement relative to said valve seat, means for energizing said electromagnet, means for separating the valve member from the electromagnet and for moving said valve member into engagement with the valve seat upon deenergization of the electromagnet, means for moving the electromagnet to position to pick up the valve member when the electromagnet is energized, means for retracting the electromagnet away from the valve seat and operable to move the valve member with the electromagnet and to open position when the electromagnet is energized, a second valve member actuated to open position by the means for moving the electromagnet to position to pick up said first valve member, and means for closing said second valve member and for maintaining same closed when said first valve member is closed and said electromagnet is in retracted position away from the valve seat.

6. In combination, a valve seat, a valve member cooperable with said valve seat and provided with an armature portion, and an electromagnet comprising a magnet frame and an energizing coil therefor mounted for rectilinear movement toward and away from said valve seat, said electromagnet having movement toward said valve seat and into position for cooperation with the armature portion of said valve member adjacent the valve seat to pick up said valve member, and in the opposite direction, away from said valve seat to move said valve member to open position when the magnet frame of said electromagnet is energized by said coil.

7. In combination, a valve seat, a valve member cooperable with said valve seat and provided with an armature portion, an electromagnet comprising a magnet frame and an energizing coil therefor mounted for movement relative to said valve seat, said electromagnet having movement toward said valve seat and into cooperation with the armature portion of said valve member to pick up said valve member and, in the opposite direction, away from said valve seat to move said valve member therewith to open position when the magnet frame of said electromagnet is energized by said coil, and means for actuating said electromagnet to position away from said seat and normally retaining the electromagnet in said position.

8. In combination, a valve seat, a valve member cooperable with said valve seat and provided with an armature portion, an electromagnet comprising a magnet frame and an energizing coil therefor mounted for movement relative to said valve seat, said electromagnet having movement toward said valve seat and into cooperation with the armature portion of said valve member to pick up said valve member and, in the opposite direction, away from said valve seat to move said valve member therewith to open position when the magnet frame of said electromagnet is energized by said coil, means for actuating said electromagnet to position away from said seat and normally retaining the electromagnet in said position, and means for moving the valve member away from said electromagnet and into engagement with the valve seat upon deenergization of said electromagnet.

9. In combination, an enclosure, a reciprocatory reset stem extending through a wall of said enclosure and having its outer end exposed externally of said enclosure to be engaged manually and pressed inwardly, an electromagnet disposed within said enclosure and fixed on the inner end of said reset stem for reciprocatory movement therewith, a valve seat, a valve member cooperable with said valve seat and provided with an armature portion, said electromagnet being adapted by pressing said reset stem inwardly to be moved into cooperation with the armature portion of said valve member to pick up said valve member and movable in the opposite direction away from said valve seat to move said valve member therewith to open position when the electromagnet is energized, and means for actuating said electromagnet to position away from said seat and normally retaining the electromagnet in said position and the reset stem in outwardly projected position.

10. In combination, an enclosure, a reciprocatory reset stem extending through a wall of said enclosure and having at its outer end an externally exposed reset button, an electromagnet disposed within said enclosure and fixed on the inner end of said reset stem for reciprocatory movement therewith, a valve seat, a valve member cooperable with said valve seat and provided with an armature portion, said electromagnet being adapted by pressing said reset button inwardly to be moved into cooperation with the armature portion of said valve member to pick up said valve member and movable in the opposite direction away from said valve seat to move said valve member therewith to open position when the electromagnet is energized, and spring means interposed between said reset button and a wall of said enclosure for actuating said electromagnet to position away from said seat and normally retaining the electromagnet in said position and the reset button in outwardly projected position.

11. In combination, a valve seat, a valve member cooperable with said valve seat and provided with an armature portion, an electromagnet comprising a magnet frame and an energizing coil therefor mounted for rectilinear movement toward and away from said valve seat, said electromagnet having movement toward said valve seat and into position for cooperation with the armature portion of said valve member adjacent the valve seat to pick up said valve member and in the opposite direction away from said valve seat to move said valve member to open position when the magnet frame of said electromagnet is energized by said coil, an enclosure, and a reciprocatory reset stem extending through a wall of said enclosure and having its outer end exposed externally of said enclosure to be engaged manually and pressed inwardly, the inner end of said reset stem being fixed to the magnet frame within said enclosure.

HAROLD A. MANTZ.